US008210378B2

(12) United States Patent
Takeuchi et al.

(10) Patent No.: US 8,210,378 B2
(45) Date of Patent: Jul. 3, 2012

(54) WATERPROOF BOX (75) Inventors: Kunihiko Takeuchi, Kakegawa (JP);
Takeshi Onoda, Kakegawa (JP);
Noriaki Akamine, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 199 days.

(21) Appl. No.: 12/621,892

(22) Filed: Nov. 19, 2009

(65) Prior Publication Data
US 2010/0127012 A1 May 27, 2010

(30) Foreign Application Priority Data
Nov. 25, 2008 (JP) ................................ 2008-298947

(51) Int. Cl.
B65D 6/28 (2006.01)
B65D 8/18 (2006.01)
(52) U.S. Cl. ........ 220/4.02; 220/3.8; 220/810; 174/50.5
(58) Field of Classification Search ............ 220/3.8, 220/4.02, 4.22, 62.18, 810
See application file for complete search history.

(56) References Cited

U.S. PATENT DOCUMENTS

| 5,703,325 | A | 12/1997 | Yamaguchi |
| 6,629,619 | B2 * | 10/2003 | Sato et al. ............... 220/4.02 |
| 2003/0136780 | A1 | 7/2003 | Sato |

FOREIGN PATENT DOCUMENTS

| EP | 1 187 284 A2 | 3/2002 |
| FR | 2 844 106 A1 | 3/2004 |
| JP | 09-046059 A | 2/1997 |
| JP | 09-216648 A | 8/1997 |
| JP | 11-310277 A | 11/1999 |
| JP | 2000-316219 A | 11/2000 |
| JP | 2004-312905 A | 11/2004 |

OTHER PUBLICATIONS

Extended European Search Report issued in counterpart European Application No. 09176417.5 dated Mar. 11, 2010.

* cited by examiner

*Primary Examiner* — Harry Grosso
(74) *Attorney, Agent, or Firm* — Sughrue Mion, PLLC (57) ABSTRACT

The present invention provides a waterproof box which has small size, high workability in its assembling, and high waterproof character. The waterproof box includes a body including a peripheral body wall which has an annular convex rim defining an opening, and a first fulcrum portion which is provided on the peripheral body wall; and a cover covering the opening and including a peripheral cover wall which has an annular chase defined by a inner wall and an outer wall and engaged with the annular convex rim, and a second fulcrum portion which is provided on the peripheral cover wall and engaged with the first fulcrum portion so that the cover rotates about the fulcrum portions. A height of a first edge of the inner wall corresponding to the second fulcrum portion is lower than that of a second edge of the inner wall adjacent to the first edge.

5 Claims, 5 Drawing Sheets

WATERPROOF BOX

CROSS-REFERENCE TO RELATED APPLICATIONS

This application claims priority from Japanese Patent Application No. 2008-298947 filed on Nov. 25, 2008, the entire subject matter of which is incorporated herein by reference.

TECHNICAL FIELD

The present invention relates to a waterproof box which is so constructed that respective joint parts of a box body and a cover are superposed on each other thereby to attain waterproofing.

BRIEF DESCRIPTION OF THE RELATED ART

An electrical junction box (a junction box, a fuse box, a relay box, etc.) which contains electrical equipments such as components for interconnecting wire harnesses, fuses, relays, and electronic control units is provided in an engine room or in a lower part of a vehicle body. Some of the electrical junction boxes have a structure as a waterproof box in itself, for the purpose of preventing intrusion of water into the electrical junction box at a time of driving or cleaning the vehicle (there is such anxiety that the components such as a circuit may be short-circuited or a leak current may flow).

For example, in a waterproof box (a watertight case) disclosed in JP-A-H09-216648 as described below, the waterproof box includes a box body having an upper opening, and a cover for covering this upper opening of the box body. The waterproof box has such a structure that respective joint parts of the box body and the cover are superposed on each other thereby to attain waterproofing. In this structure, the joint part of the box body includes a waterproof convex rim in an annular shape which is formed at a tip end of a peripheral wall of the box body, and the joint part of the cover includes a waterproof chase in an annular shape which is formed at a tip end of a peripheral wall of the cover.

When the cover is straightly moved downward from a position above the upper opening of the box body, and the respective joint parts are superposed on each other to be engaged, the waterproof chase is inserted over the waterproof convex rim. Moreover, a U-shaped cover lock which is provided near the joint part of the peripheral cover wall is hooked on a body lock which is provided near the joint part of the peripheral body wall, whereby the box body and the cover are locked to each other. In this manner, the waterproof box is in a locked state. The body locks and the cover locks are provided at least at two positions at both right and left sides (or at both front and back sides) of the waterproof box.

SUMMARY

In the above described related art, since the lock state at least at two positions must be respectively released in order to release the locked state between the body lock and the cover lock, this releasing operation is annoying to a worker or user. There is another problem that in order to respectively release the locked state at the two positions and to detach the cover, it is necessary to secure a sufficiently large space above the water proof box for enabling both hands to be used. It is needless to say that maintenance of waterproof performance must be taken into consideration, when these problems are to be solved.

The invention has been made in view of the above described circumstances, and it is an object of the invention to provide a waterproof box which can attain enhancement of workability and space saving while waterproof performance is maintained.

A waterproof box according to the first aspect of the present invention includes a body including a peripheral body wall which has an annular convex rim defining an opening, and a first fulcrum portion which is provided on the peripheral body wall; and a cover covering the opening and including a peripheral cover wall which has an annular chase defined by a inner wall and an outer wall and engaged with the annular convex rim, and a second fulcrum portion which is provided on the peripheral cover wall and engaged with the first fulcrum portion so that the cover rotates about the fulcrum portions. A height of a first edge of the inner wall corresponding to the second fulcrum portion is lower than that of a second edge of the inner wall adjacent to the first edge.

According to the first aspect of the invention, the cover becomes rotatable about the fulcrum portions. By rotating the cover, it is possible to cover the opening of the box body with the cover or to detach the cover. It would be sufficient to provide a lock structure for bringing the box body and the cover into a locked state, only at an opposite position to a position where the fulcrum portions are provided. In short, release of the locked state can be done by an operation at only one position. Because the height of the inner wall of the annular chase at the position corresponding to the fulcrum portions are made lower, smooth rotation of the cover can be secured. Even though the height is made lower, the waterproof performance can be maintained, because of presence of the inner wall itself.

A second aspect of the present invention is that the body includes an inner peripheral wall and the inner wall of the cover is positioned between the inner peripheral wall and the peripheral body wall.

According to the second aspect, the box body having a double peripheral wall is obtained. Even though water has intruded from a space between the waterproof chase and the waterproof convex rim, this intruded water is blocked by the inner peripheral wall.

A third aspect of the present invention is that the body includes a drain hole at a bottom of a space between the peripheral body wall and the inner peripheral wall.

According to the third aspect, the water blocked by the inner peripheral wall is rapidly drained through the drain hole.

A fourth aspect of the present invention is that the waterproof box further includes a lower cover including a drain hole which is continued to a space between the peripheral body wall and the inner peripheral wall, wherein the body includes a lower opening which is covered by the bottom cover.

According to the fourth aspect, the water blocked by the inner peripheral wall is rapidly drained through the drain hole which is formed in the lower cover.

According to the first aspect of the invention, by providing the fulcrum portion to make the cover rotatable, and also by adjusting the height of the inner wall of the waterproof chase, it is possible to attain enhancement of workability and space saving, while the waterproof performance is maintained.

According to the second aspect of the invention, it is possible to contribute to maintenance of the waterproof performance by the double peripheral wall.

According to the third and fourth aspect of the invention, it is possible to rapidly drain water through the drain hole, without reserving the water.

DETAILED DESCRIPTION OF EXEMPLARY EMBODIMENTS OF THE PRESENT INVENTION

Figure 1:
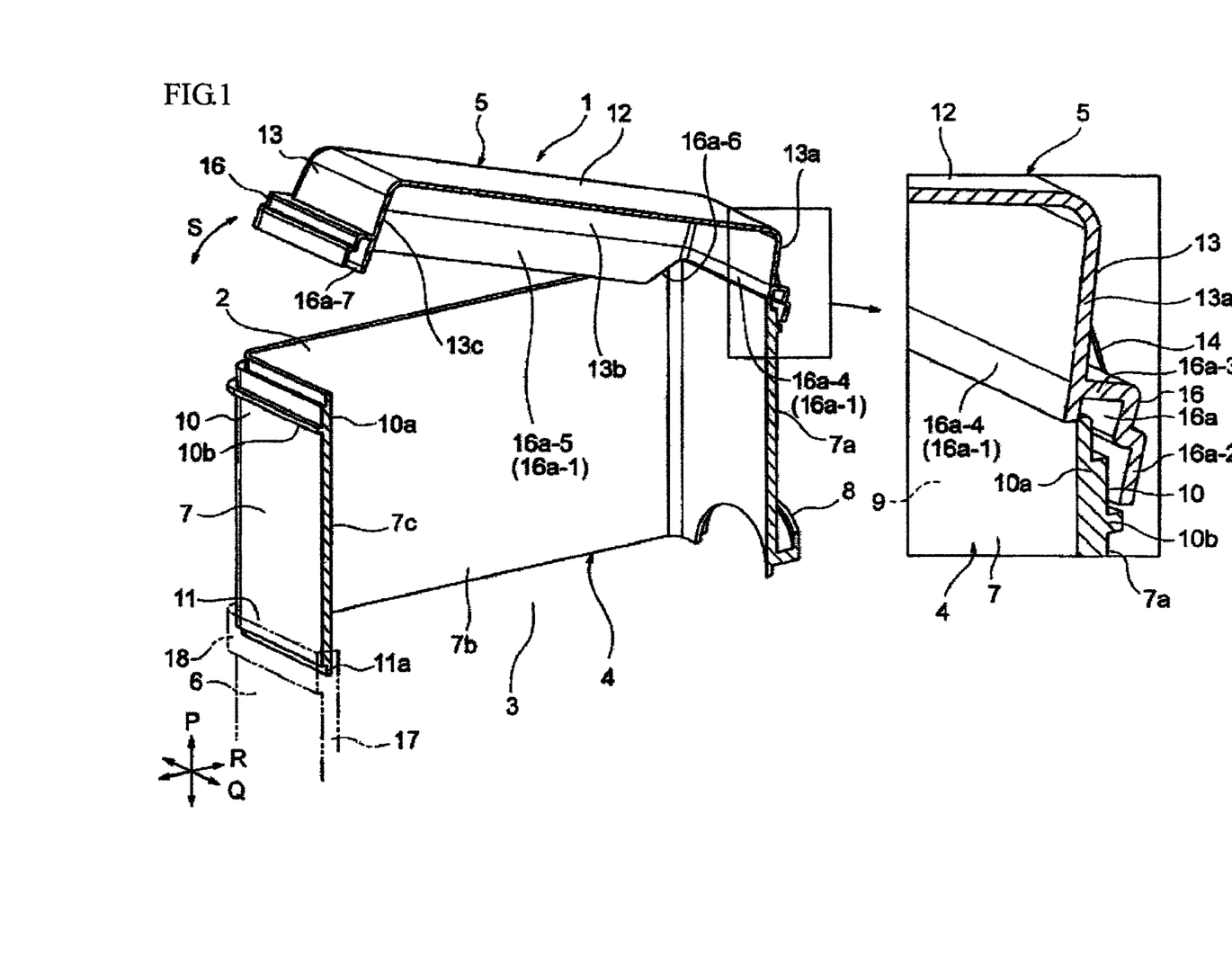
FIG. 1 is a sectional view showing an exemplary embodiment of a waterproof box according to the invention, when a cover is rotated.
Figure 2:
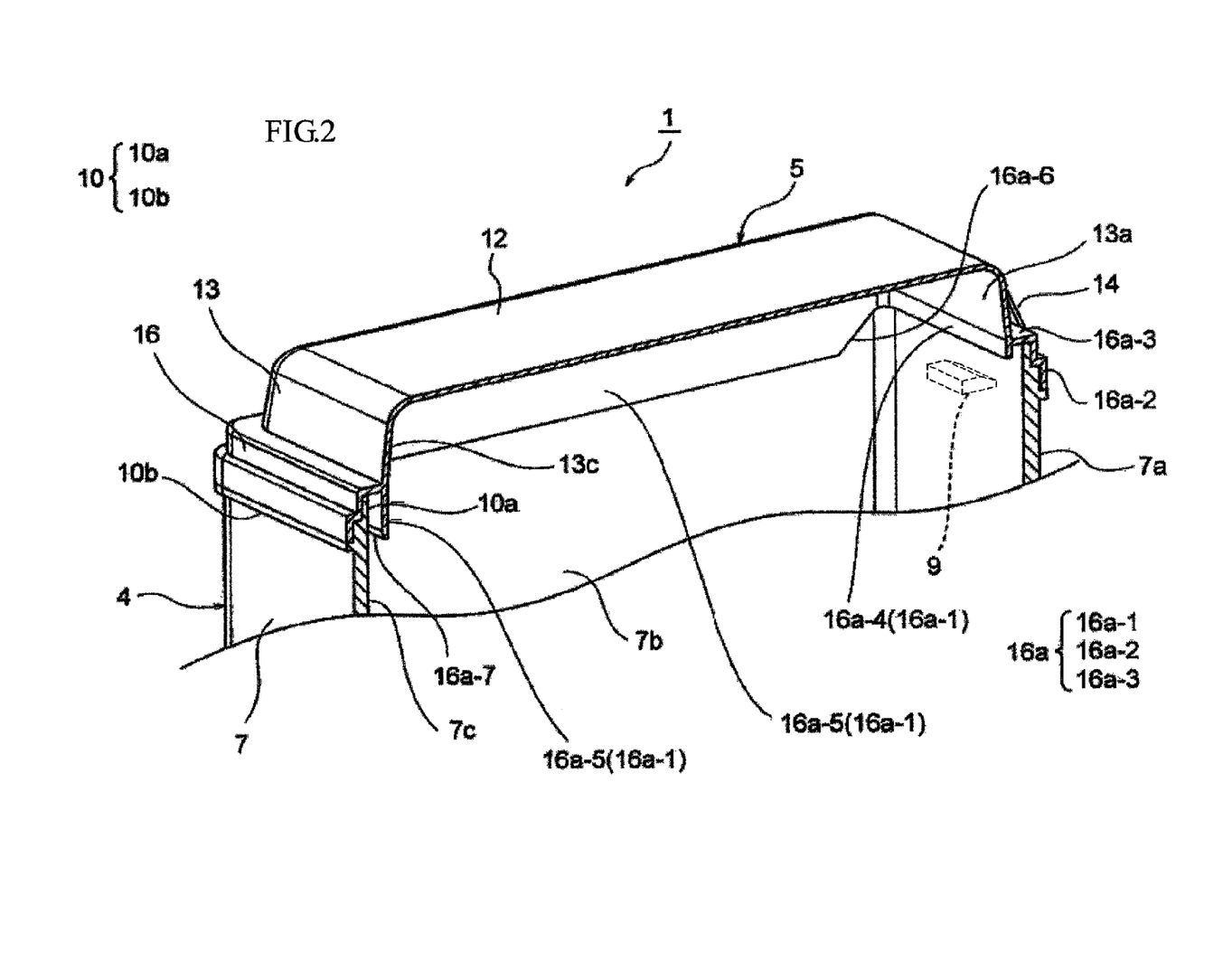
FIG. 2 is a sectional view of the exemplary embodiment of the waterproof box.

Now, the invention will be described referring to the drawings. FIG. 1 is a sectional view showing an embodiment of a waterproof box according to the invention, when a cover is rotated. FIG. 2 is a sectional view of the waterproof box, FIG. 3 is a perspective view of the cover as seen from a surface side, and FIG. 4 is a perspective view of the cover as seen from a back face side.

In FIG. 1, reference numeral 1 represents a waterproof box such as an electrical junction box. In this electrical junction box, there is contained an electrical equipment block including electrical equipments such as components for interconnecting wire harnesses, relays, etc. (The electrical equipments are well known, and not shown herein in the drawings). The waterproof box 1 includes a boxy body 4 having an upper opening 2 and a lower opening 3, an upper cover 5 (corresponding to the cover as described in the claims) for covering the upper opening 2 of the boxy body 4, and a lower cover 6 for covering the lower opening 3 of the box body 4. The box body 4, the upper cover 5, and the lower cover 6 are formed of synthetic resin, by injection molding, into such shapes as shown in the drawings, for example.

In this embodiment, an arrow mark P, an arrow mark Q, and an arrow mark R in FIG. 1 are respectively defined as a vertical direction, a lateral direction, and a longitudinal direction. An arrow mark S represents a direction of rotation of the upper cover 5, which will be described below. To begin with, structures of the above described members will be described.

Figure 3:
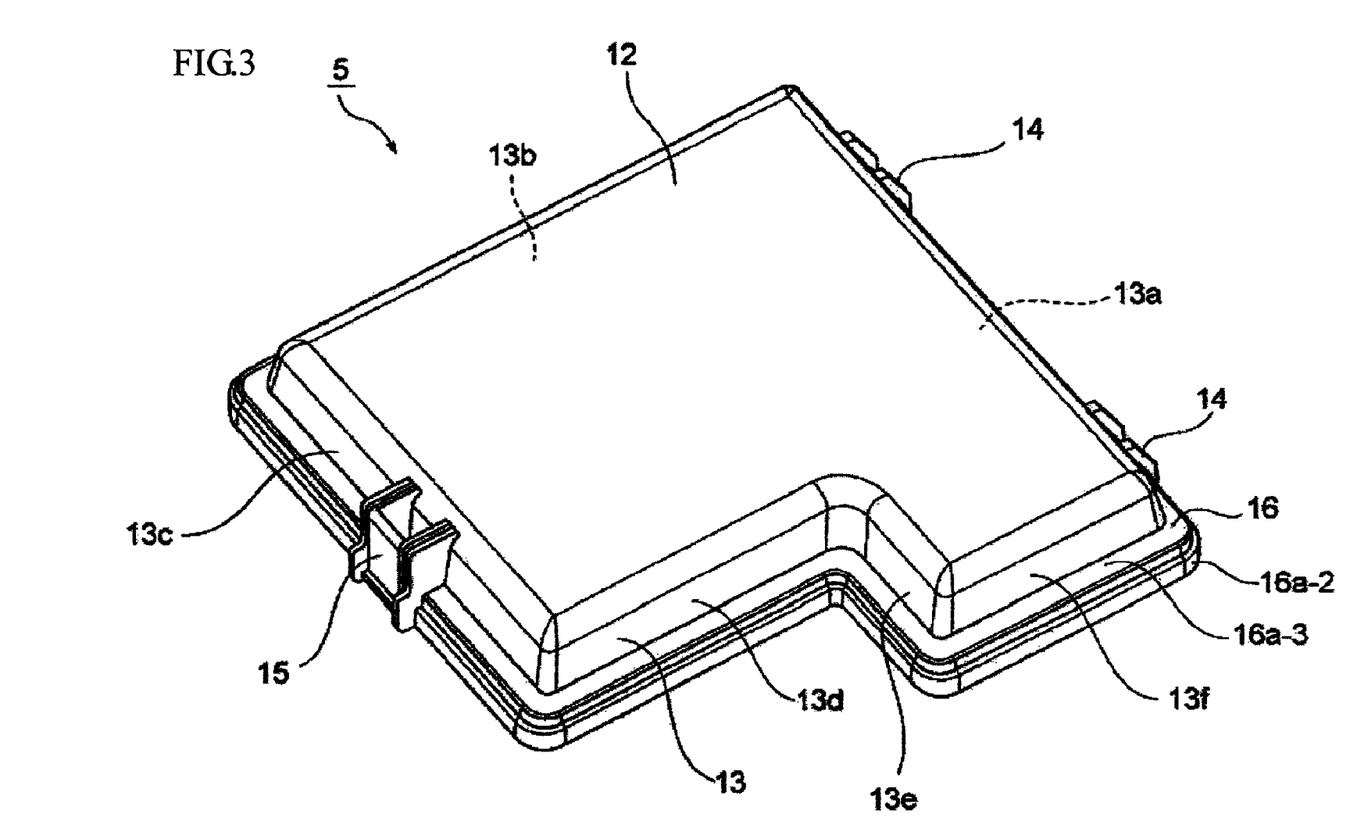
FIG. 3 is a perspective view of the cover (the perspective view as seen from a surface side).
Figure 4:
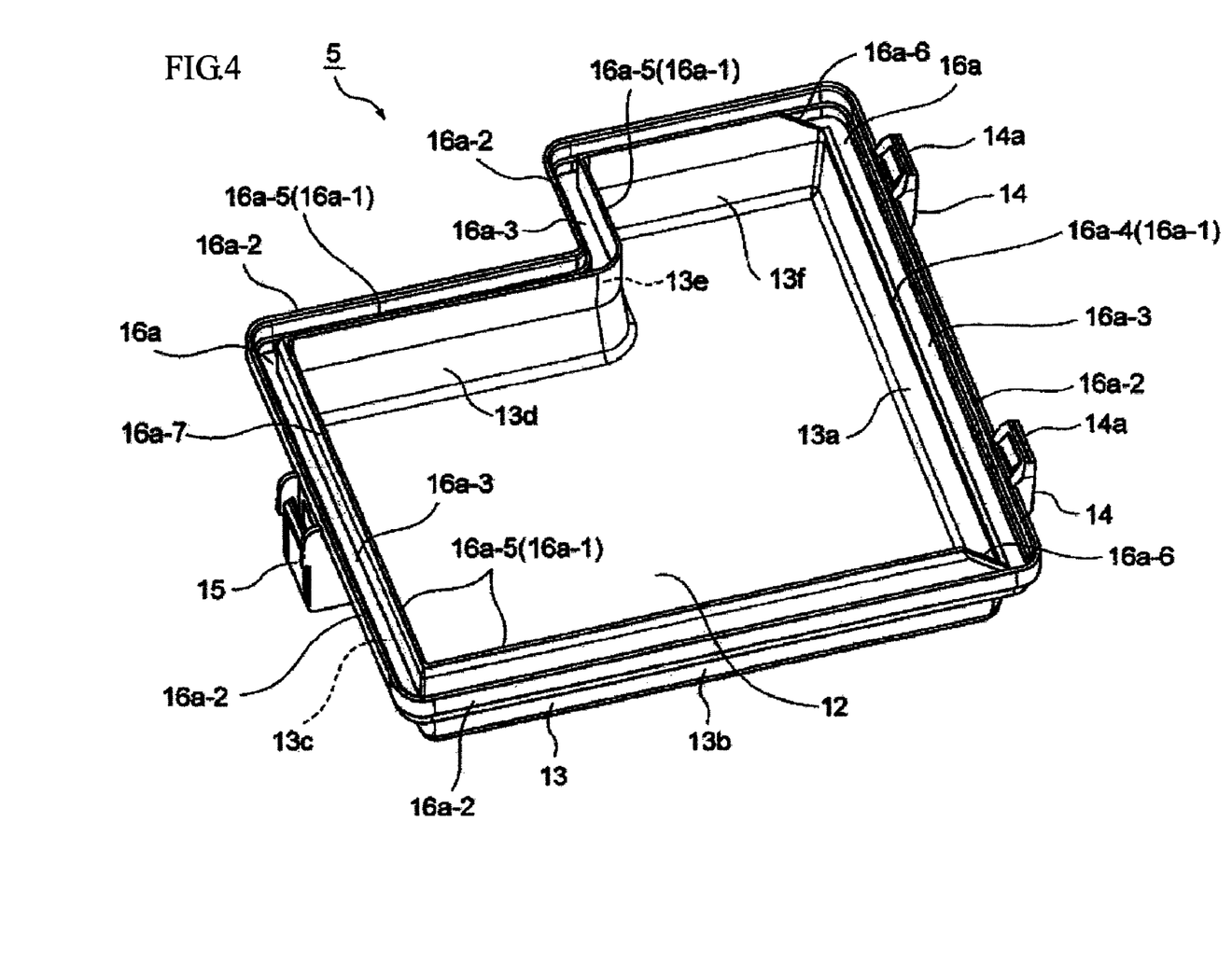
FIG. 4 is a perspective view of the cover (the perspective view as seen from a back face side).

In FIGS. 1 and 2, the box body 4 has a peripheral wall 7 composed of six continued walls in this embodiment, although not particularly limited (although all the six walls are not shown in the drawings, arrangement of the walls will be apparent from a shape of the upper cover 5 as shown in FIGS. 3 and 4). Reference numeral 7a represents a first wall, reference numeral 7b represents a second wall continued to the first wall 7a, and reference numeral 7c represents a third wall continued to the second wall 7b (the forth to sixth walls are omitted in the drawings). The sixth wall is continued to the first wall 7a.

The first wall 7a is provided with a mounting part 8 which is projected outward in a semicircular shape, and two rotation pivot parts 9 at the body side which are arranged at a determined interval. The mounting part 8 is a part where a grommet formed of rubber is to be mounted. This grommet is formed in such a manner that electric wires of the wire harnesses or the like to be connected to the components for connecting work inside the box body 4 can pass through the grommet. Each of the body side rotation pivot parts 9 is so formed and arranged as to intersect an upper joint part 10 in the first wall 7a, which will be described below. The body side rotation pivot part 9 is a part for making the upper cover 5 rotatable, and has a hook portion which will be a center of the rotation, although not particularly shown.

The third wall 7c of the peripheral body wall 7 which is arranged at an opposite side to the first wall 7a and opposed to the first wall 7a is provided with a body lock (not shown). This body lock has a known structure, and is so adapted as to be hooked on a cover lock 15 of the upper cover 5, which will be described below, thereby to bring the box body 4 and the upper cover 5 into a locked state. The body lock is so formed and arranged as to intersect an upper joint part 10 in the third wall 7c, which will be described below.

The box body 4 has the upper joint part 10 and a lower joint part 11 respectively on an entire upper circumference and an entire lower circumference of the peripheral body wall 7 where the upper opening 2 and the lower opening 3 are formed. The upper joint part 10 has a waterproof convex rim 10a in an annular shape which is formed at an upper end (a tip end) of the peripheral body wall 7, and a rib 10b in an annular shape which is arranged below this waterproof convex rim 10a. The waterproof convex rim 10a is formed in a stepped shape, as shown in the drawings (An uppermost end part of the waterproof convex rim 10a is slightly thin-walled, and has a taper of a very small width). A shape of the waterproof convex rim 10a in the stepped shape is constant along an entire circumference thereof.

The rib 10b is formed so as to project in a direction perpendicular to an outer face of the peripheral body wall 7. An amount of projection of the rib 10b is substantially equal to a thickness of an outer wall 16a-2 of a waterproof chase 16a of the upper cover 5, which will be described below. The rib 10b has also a function of preventing water from flowing along the outer face of the peripheral body wall 7 from below to above.

The lower joint part 11 has a waterproof convex rim 11a which is formed at a lower end of the peripheral body wall 7. The waterproof convex rim 11a has a stepped shape in the same manner as the upper waterproof convex rim 10a.

The peripheral body wall 7 is so formed as to have an undulated outer face, because of presence of the upper joint part 10 and the lower joint part 11. On the other hand, an inner face of the peripheral body wall 7 is formed as a flat face, in this embodiment.

In FIG. 1 to FIG. 4, the upper cover 5 has a ceiling wall 12, and a peripheral wall 13 of the cover which is continued to a circumferential edge of the ceiling wall 12. The peripheral cover wall 13 is composed of six continued walls in this embodiment. Reference numeral 13a represents a first wall, reference numeral 13b represents a second wall continued to the first wall 13a, reference numeral 13c represents a third wall continued to the second wall 13b, reference numeral 13d represents a fourth wall continued to the third wall 13c, reference numeral 13e represents a fifth wall continued to the fourth wall 13d, and reference numeral 13f represents a sixth wall continued to the fifth wall 13e and the first wall 13a.

The first wall 13a is provided with two cover side rotation pivot parts 14 (exemplary embodiment of the second fulcrum portion) which are arranged at a determined interval. Each of the cover side rotation pivot parts 14 is so formed and arranged as to intersect a joint part 16 of the first wall 13a, which will be described below. The cover side rotation pivot part 14 is a part for making the upper cover 5 rotatable with respect to the box body 4, and has a pivotal shaft 14a which is adapted to be engaged (hooked) with a hook portion of the body side rotation pivot part 9 (exemplary embodiment of the first fulcrum portion) in the box body 4, and thus becomes a center of the rotation.

The third wall 13*c* of the peripheral cover wall 13 which is arranged at an opposite side to the first wall 13*a* and opposed to the first wall 13*a* is provided with the cover lock 15. This cover lock 15 has a known structure, and is so adapted as to be hooked on the aforesaid body lock (not shown) thereby to bring the box body 4 and the upper cover 5 into the locked state. The cover lock 15 is so formed and arranged as to intersect a joint part 16 in the third wall 13*c*, which will be described below.

The upper cover 5 has the joint part 16 along an entire circumference of the peripheral cover wall 13. The joint part 16 is formed as a part to be superposed on the upper joint part 10 of the box body 4 thereby to attain waterproofing. The joint part 16 includes the waterproof chase 16*a* in an annular shape which is formed at a lower end (a tip end) of the peripheral cover wall 13. The waterproof chase 16*a* is so constructed as to be inserted over the waterproof convex rim 10*a* in the stepped shape. More specifically describing, the waterproof chase 16*a* is formed in a substantially concave shape having an inner wall 16*a*-1, an outer wall 16*a*-2, and a connecting wall 16*a*-3 which connects them to each other.

The outer wall 16*a*-2 is formed in a stepped shape corresponding to the shapes of the waterproof convex rim 10*a* and the rib 10*b* of the peripheral body wall 7. The outer wall 16*a*-2 is formed in such a manner that a lower end (a tip end) thereof extends downward until it is butted against the rib 10*b*.

The connecting wall 16*a*-3 is so formed as to project outward from an upper end of the inner wall 16*a*-1. Moreover, the connecting wall 16*a*-3 is formed in such a manner that the outer wall 16*a*-2 is suspended from its projected end. An amount of projection of the connecting wall 16*a*-3 is varied depending on positions of the walls. Specifically, at two positions of the first wall 13*a* and the third wall 13*c*, the connecting wall 16*a*-3 is so formed as to project by a larger amount than a thickness of the waterproof convex rim 10*a* in the stepped shape. At the other positions of the walls, the connecting wall 16*a*-3 is so formed as to project by a slightly larger amount than the thickness of the waterproof convex rim 10*a* (At the positions of the first wall 13*a* and the third wall 13*c*, a determined interval is formed between the inner face of the peripheral body wall 7 and the inner wall 16*a*-1. This is done for the purpose of enabling the upper cover 5 to smoothly rotate).

A length of the inner wall 16*a*-1 extending downward, in other words, a height of the inner wall is so set as to be varied depending on the positions of the walls (The height of the inner wall is varied). Specifically, the height of the inner wall at the position of the first wall 13*a* is lower than that of at the positions other than the first wall 13*a* (Compare the positions have reference numeral 16*a*-4 and 16*a*-5. The height must be such that the waterproof performance can be maintained). Because the inner walls have the different heights, slanted parts 16*a*-6 are formed. The reason why the inner walls have the different heights is for the purpose of enabling the upper cover 5 to smoothly rotate. The inner wall 16*a*-1 has a taper face 16*a*-7 at a side opposed to the outer wall 16*a*-2. The taper face 16*a*-7 is formed as a part for preventing interference with the waterproof convex rim 10*a*. It is to be noted that in case where the height of the inner wall at the position of the third wall 13*c* is low in the same manner as the inner wall 16*a*-4, the projecting amount of the connecting wall 16*a*-3 can be reduced.

An exemplary structure of the inner wall 16*a*-1 may be described in another way such that a distance between the hook portion as a center of rotation and a tip of the annular convex rim is shorter than that between the center of rotation and an end of the inner wall in sectional view perpendicular to the body wall. Of course, the description of above structure can be modified depending on the specific engagement structure of the rotation pivot parts such as the hook portion.

The lower cover 6 includes a bottom wall (not shown), and a peripheral cover wall 17 which is continued to a circumferential edge of the bottom wall. The peripheral cover wall 17 is composed of six continued walls (not shown). The lower cover 6 has a joint part 18 along an entire circumference or the peripheral cover wall 17. The joint part 18 is formed as a part which is superposed on the lower joint part 11 of the box body 4 thereby to attain waterproofing. As the joint part 18 of the lower cover 6 and the lower joint part 11 of the box body 4, related waterproofing structures are adopted (for example, the waterproofing structure as disclosed in Patent Document 1 in the brief description of the related art). The lower cover 6 has such an engaging structure that the lower cover is straightly moved from below to above thereby to be engaged with the box body 4.

Although the waterproof box 1 in this embodiment includes the lower cover 6 in its structure, the lower cover 6 is not required, in case where the box body 4 has a bottomed structure.

Then, on the basis of the constitution and structure as described above, a work for assembling the upper cover 5 will be described (In case where there is a sufficient working space above the box body 4, it is possible to assemble the upper cover 5 by moving it straightly downward from a position above the box body 4, in the same manner as in the related art. However, in this embodiment, the description will be made in case where there is no sufficient space above the box body 4).

The upper cover 5 is moved from a front side to a back side of the box body 4 (the third wall 7*c* is defined as the front side), or the upper cover 5 is moved diagonally from an upper front side to a lower back side of the box body 4, and then, the pivotal shaft 14*a* of the cover side rotation pivot part 14 in the upper cover 5 is hooked on the hook portion of the body side rotation pivot part 9 in the box body 4. In this manner, the upper cover 5 is brought into a rotatable state with respect to the box body 4. On this occasion, the waterproof chase 16*a* at the position of the first wall 13*a* of the peripheral cover wall 13 of the upper cover 5 is in a state inserted over the tip end of the waterproof convex rim 10*a* of the box body 4 (In the state after the pivotal shaft 14*a* has been hooked on the hook part, the inner wall 16*a*-1 near the pivot position, which is the center of the rotation, will not be butted against the waterproof convex rim 10*a* to hinder the rotation, because the inner wall 16*a*-4 which is lower in height is provided as the inner wall 16*a*-1).

After the upper cover 5 has been brought into the rotatable state with respect to the box body 4, the upper cover 5 is rotated so as to cover the upper opening 2 of the box body 4, and then, the cover lock 15 of the upper cover 5 is locked to the body lock of the box body 4 (brought into the locked state. In this state, the upper cover 5 will not be detached, because the pivotal shaft 14*a* is hooked on the hook portion at the opposite side to the locked state), whereby a series of works for assembling the upper cover 5 is completed. The upper joint part 10 of the box body 4 and the joint part 16 of the upper cover 5 are brought into a state superposed on each other (into a state where the waterproof chase 16*a* is inserted over the waterproof convex rim 10*a*). Accordingly, the waterproofing structure in this region is completed (See FIG. 2).

In case where water should intrude into the waterproof box 1 from the exterior, the water intrudes through a slight space between the lower end (the tip end) of the outer wall 16*a*-2 of the waterproof chase 16*a* of the upper cover 5 and the rib 10*b* of the box body 4. Because the waterproof convex rim 10*a* and the waterproof chase 16*a* are formed in the stepped shape, the intruded water hardly moves upward. Even though the water should override the tip end of the waterproof convex rim 10*a*, the water will not be directly blown to the electrical equipment block or the like inside the waterproof box 1, because there is provided the inner wall 16*a*-1 of the waterproof chase 16*a* inside the waterproof chase 10*a*, and this inner wall 16*a*-1 serves as a shielding wall. The inner wall 16*a*-1 has sufficient shielding effect to prevent the water from being directed to the electrical equipment block or the like, even though the inner wall 16*a*-4 having the lower height is provided as the inner wall 16*a*-1.

Then, a work for detaching the upper cover 5 will be described. This work can be easily done with one hand. Specifically, the cover lock 15 and the body lock are in the locked state at only one position, in this embodiment, and this locked state can be released with the one hand. Moreover, the rotation of the upper cover 5 after the locked state has been released can be also done with one hand. Thereafter, a work for completely detaching the upper cover 5, by releasing the hooked state between the cover side rotation pivot part 14 and the body side rotation pivot part 9 can be also done with one hand (There is no necessity of inserting the other hand for releasing the aforesaid hooked state).

As has been herein described referring to FIG. 1 to FIG. 4, according to the invention, the upper cover 5 (the cover) is made rotatable, by providing the body side rotation pivot part 9 and the cover side rotation pivot part 14 (the rotation pivot part), and at the same time, the height of the inner wall of the waterproof chase 16*a* is adjusted. Therefore, it is of course possible to maintain the waterproof performance in the same manner as in the prior art, and particularly, workability on occasion of detaching the upper cover 5 can be enhanced. Moreover, in spite of space saving, it is possible to easily assemble and detach the upper cover 5.

Figure 5:
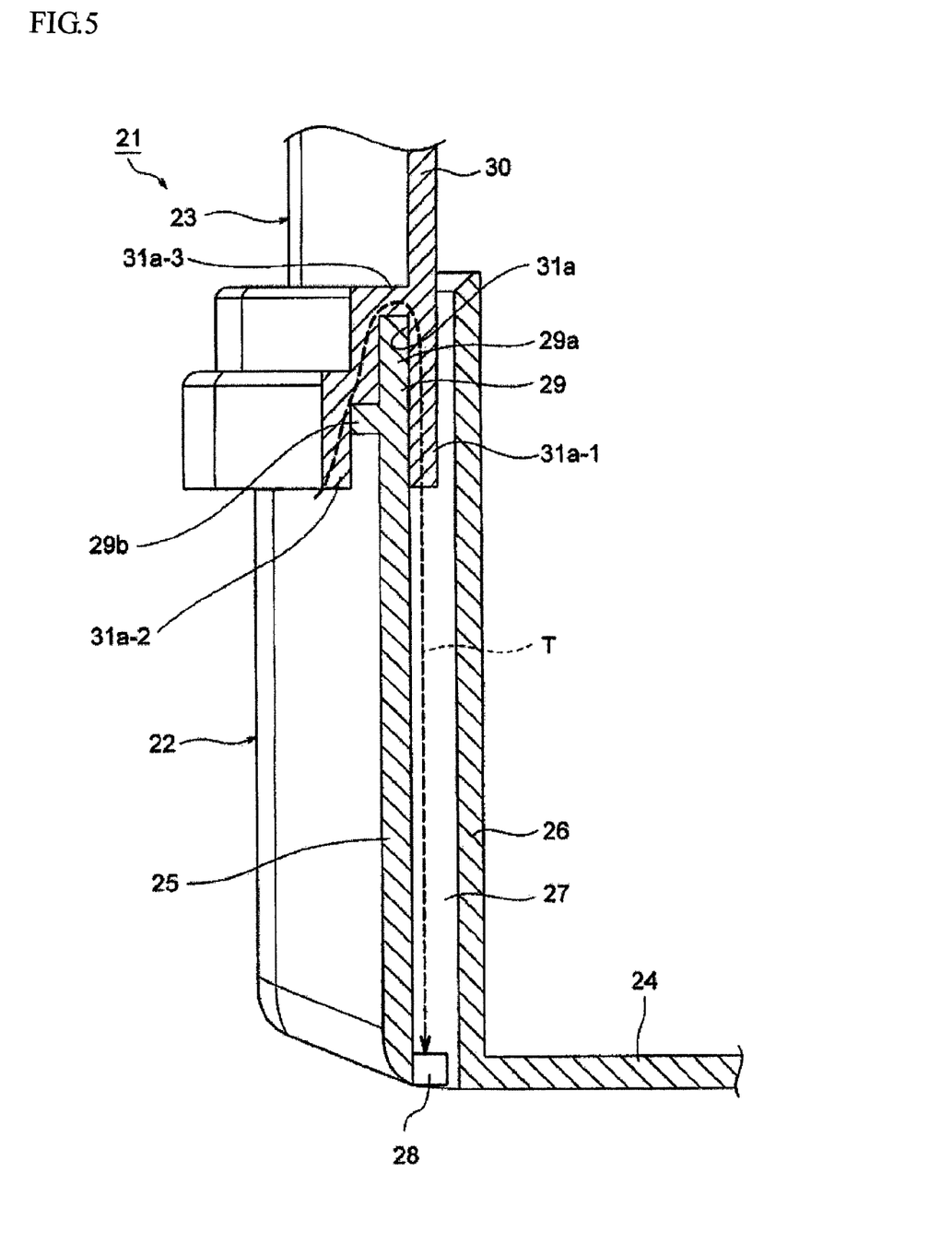
FIG. 5 is a sectional view showing another embodiment of the waterproof box.

Then, referring to FIG. 5, another embodiment of the waterproof box will be described. FIG. 5 is a sectional view showing the other embodiment.

In FIG. 5, the waterproof box 21 includes a bottomed box body 22 and a cover 23 for covering an upper opening of this box body 22. The box body 22 and the cover 23 are formed of synthetic resin, by injection molding, into such shapes as shown in the drawing, for example.

The box body 22 has a bottom wall 24, a peripheral wall 25 of the box body which is continued to a circumferential edge of this bottom wall 24, and an inner peripheral wall 26 which is formed more inward of the box than the peripheral body wall 25. A space 27 is formed between the peripheral body wall 25 and the inner peripheral wall 26. A drain hole 28 having a sufficient size to drain water is formed in a lower part of the space 27. The box body 22 has such a structure that the water is not reserved in the lower part of the space 27.

In case where the box body is not the bottomed box body 22, but it is a box body which is so constructed that a lower cover is to be engaged therewith, a drain hole may be formed in the lower cover. In this case, the drain hole is continued to the space between the inner periphery wall 26 and the body peripheral wall 7.

The inner peripheral wall 26 is so formed as to be slightly higher than the peripheral body wall 25. The inner peripheral wall 26 has a function as a shielding wall against water which has intruded.

The peripheral body wall 25 has a joint part 29 along an entire circumference of its upper part. The joint part 29 has a waterproof convex rim 29*a* in an annular shape which is formed at an upper end (a tip end) of the peripheral body wall 25, and a rib 29*b* in an annular shape which is provided below this waterproof convex rim 29*a*. The waterproof convex rim 29*a* is so formed as to have a constant shape along an entire circumference thereof.

The cover 23 has a ceiling wall, and a peripheral cover wall 30 continued to a circumferential edge of this ceiling wall. The cover 30 has a joint part 31 along an entire circumference of the peripheral cover wall 30. The joint part 31 is formed as a part to be superposed on the upper joint part 29 of the box body 22 thereby to attain waterproofing. The joint part 31 includes a waterproof chase 31*a* in an annular shape which is formed at a lower end (a tip end) of the peripheral cover wall 30. The waterproof chase 31*a* is so constructed as to be inserted over the waterproof convex rim 29*a*. The waterproof chase 31*a* is formed in a substantially concave shape in section, having an inner wall 31*a*-1, an outer wall 31*a*-2 in a stepped shape, and a connecting wall 31*a*-3 which connects them to each other.

The inner wall 31*a*-1 is so arranged as to be inserted between the peripheral body wall 25 and the inner peripheral wall 26. Although not particularly shown, the inner wall 31*a*-1 is formed in a varied state in height, having a region where a height of the inner wall is set to be low, and a region where the height of the inner wall is set to be higher than this region.

In the constitution and structure as described above, In case where water should intrude into the waterproof box 21 from the exterior, the water intrudes through a slight space between the waterproof chase 31*a* of the cover 23 and the rib 25*b* of the box body 22. Because the outer wall 31*a*-2 of the waterproof chase 31*a* is formed in the stepped shape, the intruded water hardly moves upward. There are provided the inner wall 31*a*-1 of the waterproof chase 31*a* inside the waterproof convex rim 29*a*, and the inner peripheral wall 26 more inward of the box than the inner wall 31*a*-1, and therefore, even though the water should override the tip end of the waterproof convex rim 29*a*, the water will not be directly blown to the electrical equipment block or the like inside the waterproof box 21, because the inner wall 31*a*-1 and the inner peripheral wall 26 serve as shielding walls. The water which has intruded is rapidly drained to the exterior through the drain hole 28, as shown by an arrow mark T which is shown by a broken line in FIG. 5.

As described above, according to the invention, it is possible to contribute to maintenance of the waterproof performance because of presence of the peripheral body wall 25 and the inner peripheral wall 26 which are formed as a double peripheral wall. Moreover, according to the invention, it is possible to rapidly drain water by way of the drain hole 28, without reserving the water.

In addition, it is of course possible to carry out the invention in various modifications within a scope where the gist of the invention is not changed.

The invention claimed is:

1. A water proof box comprising:
    a body including a peripheral body wall which has an annular convex rim defining an opening, and a first fulcrum portion which is provided on the peripheral body wall; and
    a cover covering the opening and including a peripheral cover wall which has an annular chase defined by an inner wall and an outer wall and engaged with the annular convex rim, and a second fulcrum portion which is provided on the peripheral cover wall and engaged with the first fulcrum portion so that the cover rotates about the first and second fulcrum portions, wherein a height of a first edge of the inner wall corresponding to the second fulcrum portion is lower than that of a second edge of the inner wall adjacent to the first edge.

2. The water proof box according to claim 1, wherein the body includes an inner peripheral wall and the inner wall of the cover is positioned between the inner peripheral wall and the peripheral body wall.

3. The water proof box according to claim 2, wherein the body includes a drain hole at a bottom of a space between the peripheral body wall and the inner peripheral wall.

4. The water proof box according to claim 2 further comprises a lower cover including a drain hole which is continued to a space between the peripheral body wall and the inner peripheral wall, wherein the body includes a lower opening which is covered by the bottom cover.

5. The waterproof box according to claim 1, wherein a center of rotation is defined by the engagement between the first and the second fulcrum portions, and a distance between the center of rotation and a tip of the annular convex rim is shorter than that between the center of rotation and an end of the inner wall in sectional view perpendicular to the peripheral body wall.

* * * * *